United States Patent
Kurosawa

(10) Patent No.: US 10,226,836 B2
(45) Date of Patent: Mar. 12, 2019

(54) CONTROLLER OF LASER MACHINING DEVICE AND CONTROLLING METHOD FOR REDUCING APPROACH TIME

(71) Applicant: FANUC Corporation, Yamanashi (JP)

(72) Inventor: Tadashi Kurosawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 14/549,203

(22) Filed: Nov. 20, 2014

(65) Prior Publication Data
US 2015/0151381 A1 Jun. 4, 2015

(30) Foreign Application Priority Data

Nov. 29, 2013 (JP) ................. 2013-247288

(51) Int. Cl.
*B23K 26/03* (2006.01)
*B23K 26/04* (2014.01)
*B23K 26/08* (2014.01)
*B23K 26/14* (2014.01)
*B23K 26/36* (2014.01)
(Continued)

(52) U.S. Cl.
CPC .......... *B23K 26/032* (2013.01); *B23K 26/048* (2013.01); *B23K 26/08* (2013.01); *B23K 26/14* (2013.01); *B23K 26/1464* (2013.01); *B23K 26/21* (2015.10); *B23K 26/36* (2013.01); *B23K 26/38* (2013.01)

(58) Field of Classification Search
CPC .... B23K 26/032; B23K 26/048; B23K 26/08; B23K 26/14; B23K 26/1464; B23K 26/20; B23K 26/36; B23K 26/38

USPC .. 219/121.6, 121.63–121.72, 121.78–121.83
See application file for complete search history.

(56) References Cited

U.S. PATENT DOCUMENTS 6,563,130 B2    5/2003  Dworkowski et al.
2003/0183608 A1* 10/2003 Yamazaki .......... B23K 26/0853
                                                    219/121.83
(Continued)

FOREIGN PATENT DOCUMENTS

DE    102012109867 A1   4/2013
JP    3-30154 A          2/1991
(Continued)

*Primary Examiner* — Ibrahime A Abraham
*Assistant Examiner* — Justin Dodson
(74) *Attorney, Agent, or Firm* — Hauptman Ham, LLP

(57) ABSTRACT

A controller of a laser machining device according to the present invention includes a positioning completion determining part for determining whether or not positioning of the nozzle is completed, a completion expectation determining part for determining whether or not the completion of the positioning of the nozzle can be expected, and a subsequent process determining part for determining whether or not a subsequent process can be carried out in the state where the completion of the positioning of the nozzle is expected. If the subsequent process can be carried out when the completion of the positioning of the nozzle is only expected, the subsequent process is carried out immediately when it is determined that the completion of the positioning of the nozzle can be expected. If the subsequent process cannot be carried out, the subsequent process is carried out only after the positioning of the nozzle is completed.

5 Claims, 12 Drawing Sheets

(51) Int. Cl.
*B23K 26/38* (2014.01)
*B23K 26/21* (2014.01)

(56) References Cited

U.S. PATENT DOCUMENTS

| | | | |
|---|---|---|---|
| 2005/0143861 A1* | 6/2005 | Watanabe | B25J 9/1684 |
| | | | 700/264 |
| 2006/0081575 A1* | 4/2006 | Egawa | B23K 26/04 |
| | | | 219/121.84 |
| 2012/0267352 A1 | 10/2012 | Wolf et al. | |
| 2013/0103183 A1* | 4/2013 | Mochida | G05B 19/19 |
| | | | 700/186 |

FOREIGN PATENT DOCUMENTS

| | | |
|---|---|---|
| JP | 7-136786 A | 5/1995 |
| JP | 8-162393 A | 6/1996 |
| JP | H09-190968 A | 7/1997 |
| JP | H09-308979 A | 12/1997 |
| JP | H10-260734 A | 9/1998 |
| JP | 2000-052076 A | 2/2000 |
| JP | 2002-318361 A | 10/2002 |
| JP | 2004-001067 A | 1/2004 |
| JP | 2004-25191 A | 1/2004 |
| JP | 2006-110592 A | 4/2006 |
| JP | 2011-210245 A | 10/2011 |
| JP | 2012-084631 A | 4/2012 |
| JP | 2013-86172 A | 5/2013 |

* cited by examiner

FIG. 5A

| SECTION | PROCESS NUMBER | PROCESS CONTENTS | NECESSARY TIME | | WHETHER OR NOT COMPLETION OF POSITIONING IS NECESSARY |
|---|---|---|---|---|---|
| 1 | N10 | POSITIONING ABOVE MACHINING START POINT | 3.0 SECONDS | | |
| | N11 | APPROACH | EXAMPLE 1 0.2 SECONDS | COMPARATIVE EXAMPLE 0.4 SECONDS | |
| | N12 | RETURN FROM POWER SAVING MODE | 1.0 SECONDS | | UNNECESSARY |
| | | OPEN ASSIST GAS | 0.5 SECONDS | | UNNECESSARY |
| | N13 | OPEN MECHANICAL SHUTTER | 0.3 SECONDS | | UNNECESSARY |
| | N14 | PIERCING | 0.1 SECONDS | | UNNECESSARY |
| | N15 | CUT LEAD-IN SECTION | 0.5 SECONDS | | UNNECESSARY |
| | N16 | CUT PRODUCT SECTION | 4.0 SECONDS | | NECESSARY |
| 2 | N20 | CLOSE ASSIST GAS | 0.1 SECONDS | | |
| | | CLOSE MECHANICAL SHUTTER | 0.3 SECONDS | | |
| | | POSITIONING ABOVE MACHINING START POINT | 1.0 SECONDS | | |
| | N21 | APPROACH | EXAMPLE 1 0.2 SECONDS | COMPARATIVE EXAMPLE 0.4 SECONDS | |
| | N22 | OPEN ASSIST GAS | 0.5 SECONDS | | UNNECESSARY |
| | | OPEN MECHANICAL SHUTTER | 0.3 SECONDS | | UNNECESSARY |
| | N23 | PIERCING | 0.1 SECONDS | | UNNECESSARY |
| | N24 | CUT LEAD-IN SECTION | 0.5 SECONDS | | UNNECESSARY |
| | N25 | CUT PRODUCT SECTION | 2.0 SECONDS | | NECESSARY |
| 3 | N30 | POSITIONING ABOVE MACHINING START POINT | 0.5 SECONDS | | |
| | N31 | APPROACH | EXAMPLE 1 0.2 SECONDS | COMPARATIVE EXAMPLE 0.4 SECONDS | |
| | N32 | PIERCING | 0.1 SECONDS | | UNNECESSARY |
| | N33 | CUT LEAD-IN SECTION | 0.5 SECONDS | | UNNECESSARY |
| | N34 | CUT PRODUCT SECTION | 7.0 SECONDS | | NECESSARY |

| SECTION | EXAMPLE 1 | COMPARATIVE EXAMPLE |
|---|---|---|
| 1 | 9.1 SECONDS | 9.3 SECONDS |
| 2 | 4.3 SECONDS | 4.5 SECONDS |
| 3 | 8.3 SECONDS | 8.5 SECONDS |
| TOTAL | 21.7 SECONDS | 22.3 SECONDS |

FIG. 7A

| SECTION | PROCESS NUMBER | PROCESS CONTENTS | NECESSARY TIME FOR EACH PROCESS CONTENT | WHETHER OR NOT COMPLETION OF POSITIONING IS NECESSARY |
|---|---|---|---|---|
| 1 | N210 | POSITIONING ABOVE MACHINING START POINT | 3.0 SECONDS | |
| | N211 | APPROACH | EXAMPLE 2 0.15 SECONDS / COMPARATIVE EXAMPLE 0.4 SECONDS | |
| | N212 | RETURN FROM POWER SAVING MODE | 1.0 SECONDS | UNNECESSARY |
| | | OPEN ASSIST GAS | 0.5 SECONDS | UNNECESSARY |
| | N213 | OPEN MECHANICAL SHUTTER | 0.3 SECONDS | UNNECESSARY |
| | N214 | CUT LEAD-IN SECTION | 0.2 SECONDS | UNNECESSARY |
| | N215 | CUT PRODUCT SECTION | 2.0 SECONDS | NECESSARY |
| 2 | N220 | CLOSE ASSIST GAS | 0.1 SECONDS | |
| | | CLOSE MECHANICAL SHUTTER | 0.3 SECONDS | |
| | | POSITIONING ABOVE MACHINING START POINT | 1.0 SECONDS | |
| | N221 | APPROACH | EXAMPLE 2 0.15 SECONDS / COMPARATIVE EXAMPLE 0.4 SECONDS | |
| | N222 | OPEN ASSIST GAS | 0.5 SECONDS | UNNECESSARY |
| | | OPEN MECHANICAL SHUTTER | 0.3 SECONDS | UNNECESSARY |
| | N223 | CUT LEAD-IN SECTION | 0.2 SECONDS | UNNECESSARY |
| | N224 | CUT PRODUCT SECTION | 1.0 SECONDS | NECESSARY |
| 3 | N230 | POSITIONING ABOVE MACHINING START POINT | 0.5 SECONDS | |
| | N231 | APPROACH | EXAMPLE 2 0.15 SECONDS / COMPARATIVE EXAMPLE 0.4 SECONDS | |
| | N232 | CUT LEAD-IN SECTION | 0.2 SECONDS | UNNECESSARY |
| | N233 | CUT PRODUCT SECTION | 3.0 SECONDS | NECESSARY |

FIG. 7B

| SECTION | EXAMPLE 2 | COMPARATIVE EXAMPLE |
|---|---|---|
| 1 | 6.65 SECONDS | 6.9 SECONDS |
| 2 | 2.85 SECONDS | 3.1 SECONDS |
| 3 | 3.9 SECONDS | 4.1 SECONDS |
| TOTAL | 13.4 SECONDS | 14.1 SECONDS |

| SECTION | EXAMPLE 3 | COMPARATIVE EXAMPLE |
|---|---|---|
| 1 | 6.65 SECONDS | 6.9 SECONDS |
| 2 | 2.85 SECONDS | 3.1 SECONDS |
| 3 | 3.85 SECONDS | 4.1 SECONDS |
| TOTAL | 13.35 SECONDS | 14.1 SECONDS |

CONTROLLER OF LASER MACHINING DEVICE AND CONTROLLING METHOD FOR REDUCING APPROACH TIME

RELATED APPLICATIONS

The present application claims priority to Japanese Application Number 2013-247288, filed Nov. 29, 2013, the disclosure of which is hereby incorporated by reference herein in its entirety.

BACKGROUND OF THE INVENTION

1. Field of the Invention

The present invention relates to a controller and a controlling method of a laser machining device.

2. Description of the Related Art

Prior to laser machining by a laser machining device, an approach operation is carried out in order to position a nozzle from which laser is radiated at a target position away from a workpiece by a predetermined distance. A common laser machining device is designed such that the approach operation ends when positioning of the nozzle is completed, and thereafter a subsequent process is carried out.

FIGS. 10A to 10D show an approach operation of a nozzle of a laser machining device. FIG. 10A is an ideal example in which a flat plate-like workpiece W is disposed at a predetermined position. In order to carry out a subsequent process, a nozzle NZ is positioned at a target position T distant from the workpiece W by a target gap amount. In this case, since the position of the workpiece W and the target gap amount are already determined, the precise positioning of the nozzle can be carried out within a short period of time, by simply moving the nozzle NZ in accordance with a position command.

However, in an actual application, the state of the workpiece W is often unknown. For example, FIG. 10B shows the workpiece W warping upward. In such a case, it is necessary to detect an unknown gap amount between the workpiece W and the nozzle NZ, and based on the detected gap amount, the nozzle NZ is moved to a target position T.

However, in a commonly-used optical gap sensor or capacitance gap sensor, accuracy in detecting the gap amount tends to decrease, when the nozzle NZ is at a relatively distant position from the workpiece W. In addition, a delay may occur due to detection of a gap amount and a position control of the nozzle NZ based on the gap amount. As a result, deceleration of the nozzle NZ may be delayed, possibly resulting in undershoot of the nozzle NZ. Therefore, for example, in the case where the warp of the workpiece W is substantial (see FIG. 10C) or an object nearby (for example, cut pieces produced as a result of a cutting process) protrudes upward from the workpiece W, there is a risk of the nozzle NZ coming into collision with the workpiece W, or the like.

If the approach operation is carried out at a low speed, the collision of the nozzle NZ can be prevented even in the case of FIGS. 10C and 10D. However, if the approach operation is carried out consistently at a low speed, the efficiency substantially decreases. In the case where the nozzle NZ merely comes in contact with the workpiece W, there is a possibility that defect of the workpiece may be avoided, and a machining process can continue. On the other hand, if the nozzle NZ comes in contact with the workpiece W during a subsequent process including laser radiation, there is a risk that a part of the workpiece W may be melted off onto other part of the workpiece W, and defect of the workpiece W may spread over a wide range. If this is the case, it may take extensive time to restore the system, for example, it may be necessary to carry out an additional process for removing the workpiece which can be no longer used. Accordingly, it is desirable to complete an approach process of the nozzle in the shortest possible time, while avoiding a risk of producing defect of the workpiece.

JP-A-9-308979 discloses a laser machining device designed to shorten the necessary time for an approach operation from a retracted position to a reference position of profile control. This laser machining device designed to control when to start deceleration, based on a stopping distance determined by a predetermined approach speed and deceleration, and on a distance from the reference position obtained by a gap sensor.

JP-A-2004-001067 discloses a laser machining device designed to shorten the necessary time for moving from a terminating point in a first process to a starting point in a following second step. In this laser machining device, a machining nozzle is moved to a position distant from the workpiece by a predetermined gap amount according to a position command, and thereafter, controlled according to a gap control using feedback of the gap amount detected by a sensor.

JP-A-2000-052076 discloses a laser machining device designed to stably increase an approach speed of a machining head. This laser machining device is controlled such that the machining head is moved at a higher speed until it becomes possible to detect a gap amount between the machining head and the workpiece by a gap sensor, and thereafter, the approach operation is switched to a lower speed.

JP-A-2011-210245, JP-A-10-260734, JP-A-9-190968, JP-A-2002-318361, and JP-A-2012-084631 disclose various common techniques for drive control, although they are not intended to control a laser machining device.

However, even if the controlling methods disclosed in JP-A-9-308979, JP-A-2004-001067, and JP-A-2000-052076 are adopted, it is still necessary to position a nozzle based on a target gap amount. Accordingly, there is a need to shorten the approach time even further.

SUMMARY OF THE INVENTION

According to a first aspect of the present invention, a controller for controlling a laser machining device with a nozzle for radiating laser, comprising: a target gap amount specifying part for specifying a target gap amount and a tolerance of the target gap amount, the target gap amount corresponding to a distance between the nozzle and a workpiece during laser machining; a gap amount detecting part for detecting an actual gap amount between the nozzle and the workpiece; a nozzle position controlling part for controlling a position of the nozzle based on the target gap amount and the actual gap amount; a positioning completion determining part for determining whether or not positioning of the nozzle is completed in accordance with the target gap amount and the tolerance of the target gap amount; a completion expectation determining part for determining whether or not completion of the positioning of the nozzle can be expected; and a subsequent process determining part for determining whether or not it is possible to carry out a subsequent process which should be carried out after the positioning of the nozzle in the state where completion of the positioning of the nozzle can be expected, wherein the controller is configured such that in the case where the subsequent process determining part determines that it is possible to carry out the subsequent process, the subsequent process is carried out at a time when the completion expectation determining part determines that completion of the positioning of the nozzle can be expected, and that in the case where the subsequent process determining part determines that it is not possible to carry out the subsequent process, the subsequent process is carried out at a time when the positioning completion determining part determines that the positioning of the nozzle is completed, is provided.

According to a second aspect of the present invention, in the controller according to the first aspect, the nozzle position controlling part is configured to continue position control of the nozzle, irrespective of the result of determination by the subsequent process determining part, the positioning completion determining part being configured to continue to determine whether or not positioning of the nozzle is completed, irrespective of the result of determination by the subsequent process determining part.

According to a third aspect of the present invention, in the controller according to the first or second aspect, the completion expectation determining part is configured to determine whether or not completion of the positioning of the nozzle can be expected, based on whether or not the nozzle and the workpiece have come in contact with each other, and on information on an operational state of the nozzle.

According to a fourth aspect of the present invention, in the controller according to any one of the first to third aspects, the completion expectation determining part is configured to determine whether or not completion of the positioning of the nozzle can be expected, based on whether or not the nozzle and the workpiece have come in contact with each other, and on whether or not a moving direction of the nozzle is reversed at least once.

According to a fifth aspect of the present invention, in the controller according to any one of the first to fourth aspects, a target gap range is set based on the target gap amount and the tolerance of the target gap amount specified by the target gap amount specifying part, and the positioning completion determining part is configured to determine that positioning of the nozzle is completed when an actual position of the nozzle comes within the target gap range and after the completion expectation determining part determines that completion of the positioning of the nozzle can be expected.

According to a sixth aspect of the present invention, in the controller according to any one of the first to fourth aspects, a target gap range is set based on the target gap amount and the tolerance of the target gap amount specified by the target gap amount specifying part, and the positioning completion determining part is configured to determine that the positioning of the nozzle is completed when an actual position of the nozzle comes within the target gap range and a moving direction of the nozzle is reversed at least once and after the completion expectation determining part determines that completion of the positioning of the nozzle can be expected.

According to a seventh aspect of the present invention, a method for controlling a laser machining device to position a nozzle through which laser is radiated at a position distant from a workpiece by a predetermined target gap amount with a predetermined tolerance, the method comprising: determining whether or not positioning of the nozzle is completed in accordance with the target gap amount and the tolerance of the target gap amount; determining whether or not completion of the positioning of the nozzle can be expected; determining whether or not a subsequent process to be carried out after the nozzle is positioned can be carried out in the state where the completion of the positioning of the nozzle can be expected; in the case where it is determined that the subsequent process can be carried out, carrying out the subsequent process when it is determined that completion of the positioning of the nozzle can be expected, and in the case where it is determined that the subsequent process cannot be carried out, carrying out the subsequent process when it is determined that positioning of the nozzle is completed, is provided.

According to an eighth aspect of the present invention, in the method according to the seventh aspect, in the case where it is determined that completion of the positioning can be expected, the positioning of the nozzle and the determination as to whether or not positioning of the nozzle is completed are continued, irrespective of the result of determination as to whether or not the subsequent process can be carried out.

According to a ninth aspect of the present invention, in the method according to the seventh or eighth aspect, the determination as to whether or not completion of the positioning of the nozzle can be expected is carried out based on whether or not the nozzle and the workpiece have come in contact with each other and on information on an operational state of the nozzle.

According to a tenth aspect of the present invention, in the method according to any one of the seventh to ninth aspects, the determination as to whether or not completion of the nozzle can be expected is carried out based on whether or not the nozzle and the workpiece have come in contact with each other and on whether or not a moving direction of the nozzle is reversed at least once.

According to an eleventh aspect of the present invention, in the method according to any one of the seventh to tenth aspects, a target gap range is set based on the target gap amount and the tolerance of the target gap amount, and it is determined that positioning of the nozzle is completed at a time when a position of the nozzle comes within the target gap range and after it is determined that completion of the positioning of the nozzle can be expected.

According to a twelfth aspect of the present invention, in the method according to any one of the seventh to tenth aspects, a target gap range is set based on the target gap amount and the tolerance of the target gap amount, and it is determined that positioning of the nozzle is completed at a time when a position of the nozzle comes within the target gap range and a moving direction of the nozzle is reversed at least once and after it is determined that completion of the positioning of the nozzle can be expected.

These and other objects, features and advantages of the present invention will become more apparent in light of the detailed description of exemplary embodiments thereof as illustrated by the drawings.

BRIEF DESCRIPTION OF THE DRAWINGS

FIG. 5A is a process schedule in the first example;

FIG. 7A is a process schedule in the second example;

FIG. 7B is a table showing the necessary time of the processes carried out in accordance with the second example;

DETAILED DESCRIPTION OF THE INVENTION

Embodiments of the present invention will be described below with reference to the accompanying drawings. Constituent elements of the illustrated embodiment may be modified in size in relation to one another as necessary for better understanding of the present invention.

Figure 1:
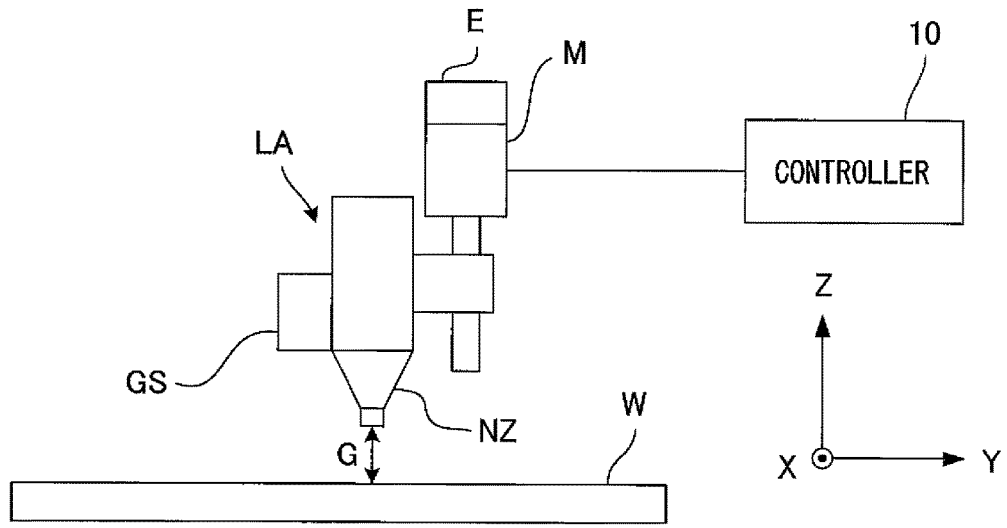
FIG. 1 schematically illustrates an exemplary configuration of a laser machining device to which the present invention can be applied.

Referring to FIG. 1, a configuration of a laser machining device will be described. FIG. 1 schematically illustrates an exemplary configuration of a laser machining device to which the present invention can be applied. A laser machining device LA is designed to radiate laser emitted from a laser oscillator, which is not shown in the drawing, through a nozzle NZ. The nozzle NZ is also designed to inject assist gas. The nozzle NZ of the laser machining device LA is driven in a Z-axis direction by a servo motor M controlled by a controller 10 such that the nozzle NZ can be moved closer to or away from a workpiece W. In order to drive the nozzle NZ in an X-axis direction and Y-axis direction, the laser machining device LA also includes corresponding servo motors, which, however, are not shown in FIG. 1. The laser machining device LA is designed to cut the workpiece W into a predetermined product shape by driving the nozzle in the X-axis direction and Y-axis direction, so as to move the nozzle NZ parallel to a surface of the workpiece W.

The laser machining device LA is provided with a gap sensor GS near the nozzle NZ. The gap sensor GS measures a distance between the nozzle NZ and the workpiece W, or a gap amount G. The servo motor M is provided with an encoder E which detects information on motion of the nozzle NZ, such as a position, velocity, acceleration and the like.

Figure 11A:
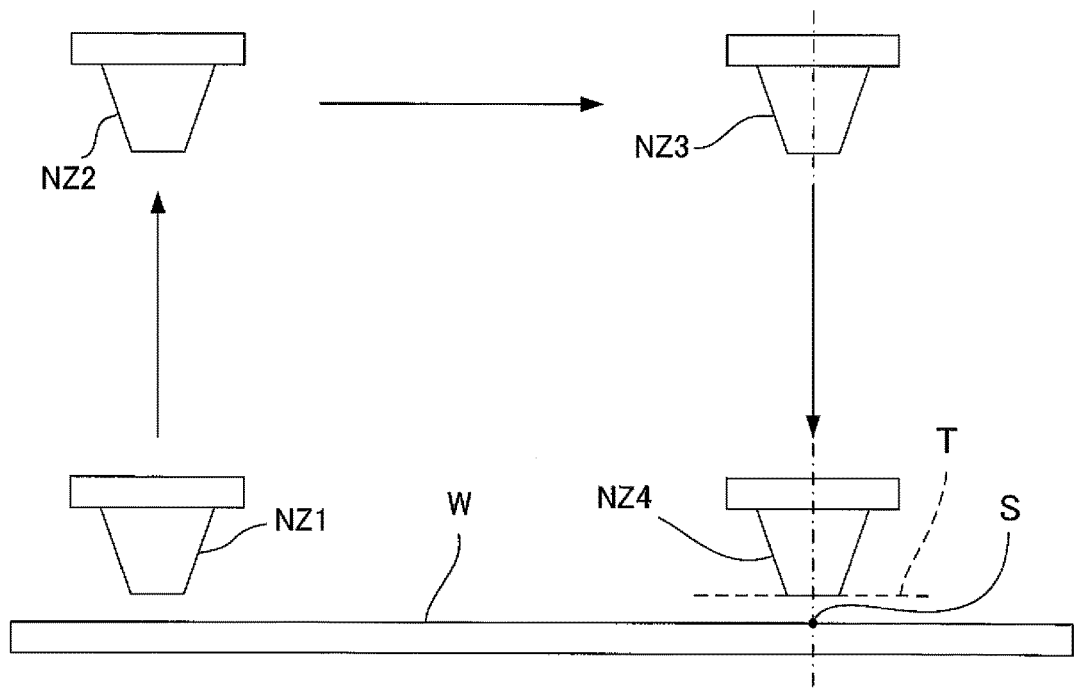
FIG. 11A shows an approach operation of a nozzle of a laser machining device.

A positioning operation of the nozzle in the laser machining device will be described. FIG. 11A shows an approach operation of the nozzle. The illustrated nozzles NZ1 to NZ4 represent the nozzle moving in association with the positioning operation, respectively. The nozzle NZ1 is in the state in which a latest machining process is completed. The nozzle NZ2 is in the state in which the nozzle is moved to a retracted position. The nozzle NZ3 is in the state in which the nozzle is positioned above a machining start point S. The nozzle NZ4 is in the state in which the positioning of the nozzle is completed.

As illustrated, the nozzle NZ1 is moved away from the workpiece W in the Z-axis direction to the retracted position (the state of the nozzle NZ2). The retracted position is a position at which the nozzle is sufficiently away from the workpiece W such that the nozzle can be avoided from being coming in contact with an expected warp of the workpiece W or an object near the workpiece W. The nozzle NZ2 is then moved in the X-axis direction and Y-axis direction, and positioned above the machining start point S specified by the machining program (the state of the nozzle NZ3). When the positioning of the nozzle NZ3 above the machining is completed, an approach operation starts. Then, the nozzle NZ3 is moved closer to the workpiece W in the Z-axis direction and positioned at a target position T distant from the workpiece W by a target gap amount (the state of the nozzle NZ4).

Figure 11B:
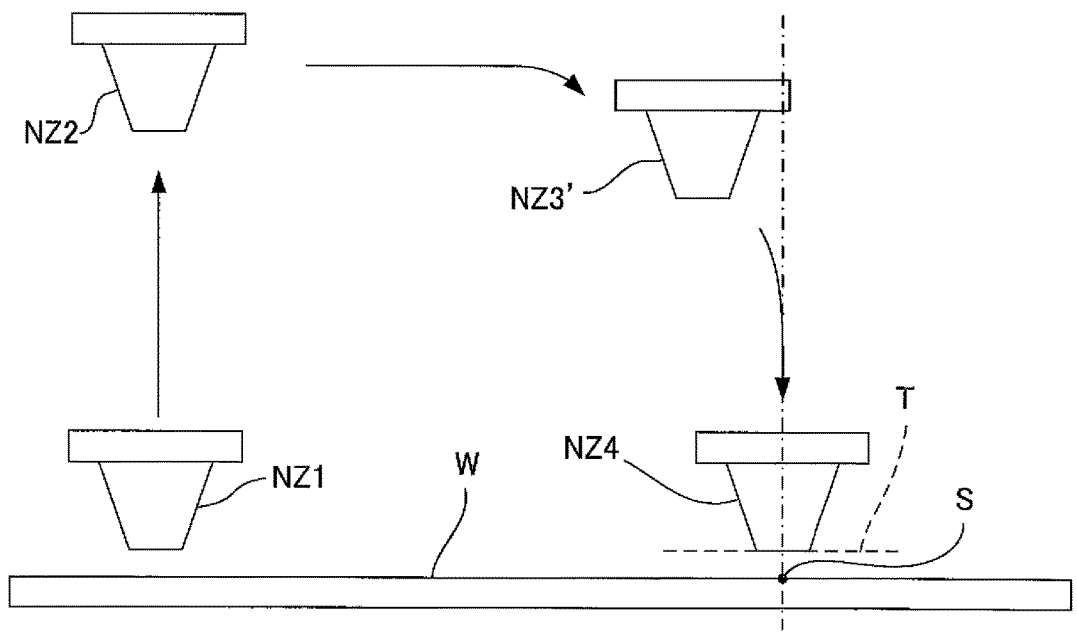
FIG. 11B shows an approach operation of a nozzle of a laser machining device.

As shown in FIG. 11B, an approach operation may be started before the positioning of the nozzle NZ above the machining start point S is completed. The nozzle NZ3' of FIG. 11B shows the state in which the approach operation of the nozzle is started, i.e., the nozzle starts to move in the Z-axis direction, even though the positioning of the nozzle above the machining start point S is not completed. More specifically, the nozzle NZ is controlled to start the approach operation when it is determined by the gap sensor that collision of the nozzle can be avoided, even in the case where the workpiece is warped or there is an object near the workpiece W. In this connection, the collision of the nozzle NZ can be avoided when the positioning of the nozzle above the machining start point S is completed before the nozzle is lowered to a height at which the possibility of the collision should be taken into account, or when the nozzle is decelerated enough to immediately stop as the nozzle faces a risk of collision. In the embodiment described below, the manner shown in FIG. 11A is adopted, or in other words, the approach operation starts only after the positioning of the nozzle above the machining start point S is completed. However, the present invention is not limited thereto, and the manner shown in FIG. 11B may also be adopted.

Figure 12:
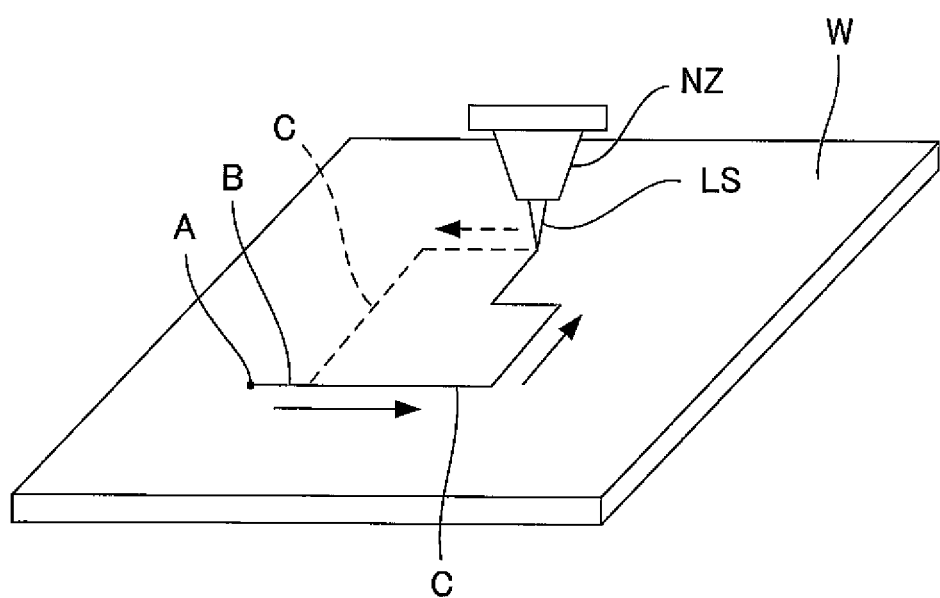
FIG. 12 shows a cutting process carried out by a laser machining device.

FIG. 12 shows a cutting process carried out by a laser machining device. In the state where the nozzle NZ is positioned relative to the workpiece W, laser LS is irradiated onto the workpiece W through the nozzle NZ. The laser LS is irradiated onto the machining start point of the workpiece W to carry out piercing. Starting from the through hole A formed as a result of the piercing, the workpiece W is cut to form a lead-in section B. Then, the workpiece W is cut along a shape C of a product section (L-shape in the illustrated example). The arrows in the drawing show the moving direction of the nozzle NZ.

Figure 2:
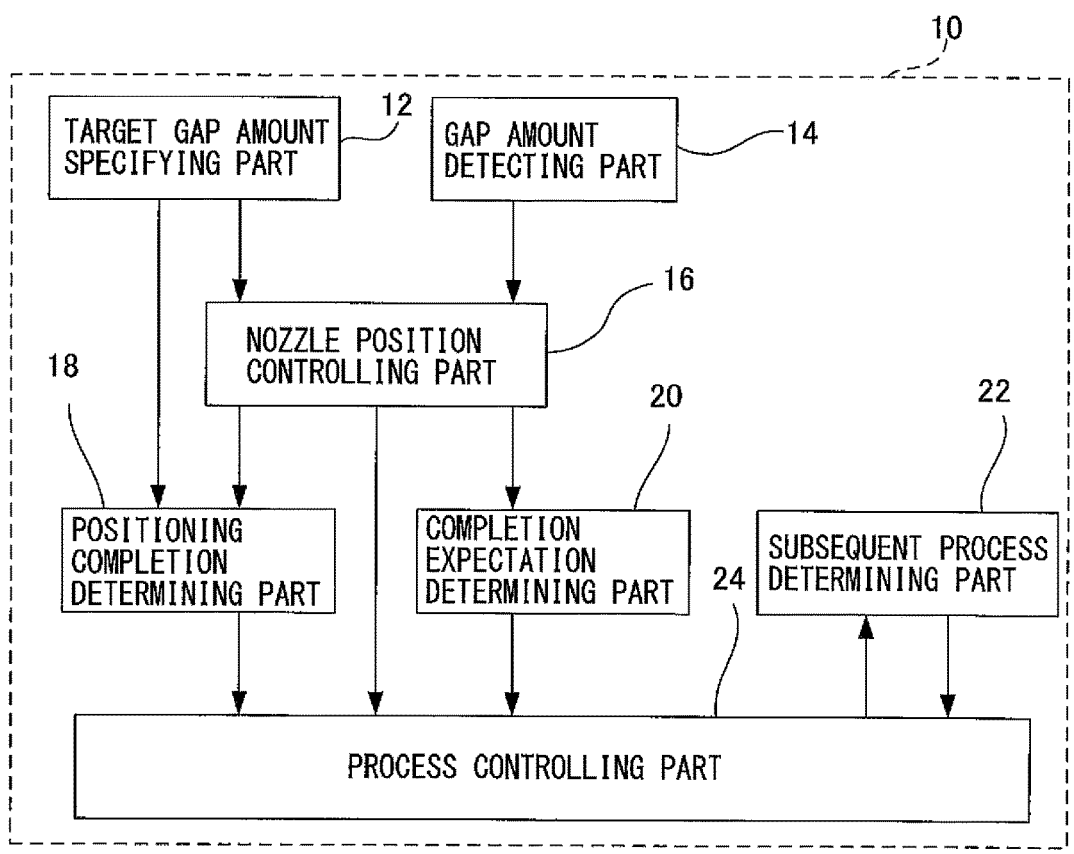
FIG. 2 is a block diagram illustrating a configuration of a controller according to one embodiment of the present invention.

FIG. 2 is a block diagram illustrating a configuration of a controller according to one embodiment of the present invention. As illustrated, the controller 10 includes a target gap amount specifying part 12, a gap amount detecting part 14, a nozzle position controlling part 16, a positioning completion determining part 18, a completion expectation determining part 20, a subsequent process determining part 22, and a process controlling part 24.

The controller 10 has a known hardware configuration including ROM for storing a machining program and the like, CPU for executing various calculation in accordance with the program, RAM for temporarily storing the result of calculation, an input means (e.g., a mouse and keyboard), a display means (e.g., a liquid crystal display), and an interface for transmitting signals to and receiving signals from an external device and the motor M and the like.

The target gap amount specifying part 12 specifies a target gap amount corresponding to a distance between the nozzle NZ and the workpiece W at the time of carrying out a subsequent process after the approach process. The target gap amount specifying part 12 also specifies a tolerance for the target gap amount. The target gap amount is an optimal distance between the nozzle NZ and the workpiece W at the time of carrying out the subsequent process. The target gap amount may be set in accordance with a focal distance of laser radiated from the nozzle NZ, for example. The target gap amount is output to the nozzle position controlling part 16 for positioning control of the nozzle NZ.

The tolerance for the target gap amount represents an amount of tolerance for the target gap amount, and is set in accordance with the required degree of accuracy of the target gap amount. The tolerance for the target gap amount is used by the positioning completion determining part 18 to determine whether or not the positioning of the nozzle NZ is completed, as described below. When accurate positioning is necessary, the tolerance is set so as to decrease an amount of tolerance for the target gap amount.

The "subsequent process" herein means a process which should be carried out in relation to the laser machining after the approach process. Therefore, the "subsequent process" is not limited to the laser machining, such as piercing, cutting and welding, but may include various preparatory process or post-process carried out in the course of the laser machining.

The gap amount detecting part 14 cooperates with the gap sensor GS to detect an actual gap amount G between the nozzle NZ and the workpiece W. The gap amount detecting part 14 may also be designed to detect the nozzle NZ coming in contact with the workpiece W, as described below. The gap amount G detected by the gap amount detecting part 14 is output to the nozzle position controlling part 16. Similarly, a notification signal notifying the nozzle NZ coming in contact with the workpiece W is output by the gap amount detecting part 14 to the nozzle position controlling part 16.

The nozzle position controlling part 16 controls the position of the nozzle NZ based on the target gap amount specified by the target gap amount specifying part 12 and on the actual gap amount detected by the gap amount detecting part 14. Specifically, the nozzle position controlling part 16 calculates a deviation amount between the target gap amount and the actual gap amount, i.e., a position deviation amount of the nozzle NZ to generate a position command to the motor M by multiplying the obtained position deviation amount with a predetermined gain. The position deviation amount calculated by the nozzle position controlling part 16 is output to the positioning completion determining part 18 and the completion expectation determining part 20.

Further, the nozzle position controlling part 16 cooperates with the encoder E of the motor M to obtain control information of the nozzle NZ, such as a position, velocity, acceleration, jerk of the nozzle NZ, and the like. The control information of the nozzle NZ is output to the positioning completion determining part 18 and the completion expectation determining part 20.

The positioning completion determining part 18 determines whether or not the positioning of the nozzle NZ is completed. For example, the positioning completion determining part 18 implements the determination based on the tolerance of the target gap amount specified by the target gap amount specifying part 12 and on the position deviation amount output from the nozzle position controlling part 16.

The result of the determination by the positioning completion determining part 18 is output to the process controlling part 24.

The completion expectation determining part 20 determines whether or not the completion of the positioning of the nozzle NZ can be expected. For example, the completion expectation determining part 20 implements the determination based on the position deviation amount output from the nozzle position controlling part 16 and on information on the operational state of the nozzle NZ. The information on the operational state of the nozzle NZ may include a position, velocity, acceleration and jerk of the nozzle NZ. The result of the determination by the completion expectation determining part 20 is output to the process controlling part 24.

The subsequent process determining part 22 determines, based on the content of the subsequent process, whether or not the subsequent process can be carried out in the state where the completion of the positioning of the nozzle NZ is only expected. For the purpose of the determination, the information on the subsequent process is input from the process controlling part 24. The result of the determination by the subsequent process determining part 22 is output to the process controlling part 24.

The process controlling part 24 carries out various subsequent processes after the approach process. The subsequent processes may include, but are not limited to, transmission of a return command for returning the laser oscillator from a waiting state in a power saving mode to an operable state, transmission of an open command for opening a supply valve of assist gas, transmission of an open command for opening a mechanical shutter of the laser oscillator, transmission of an execution command for implementing piercing, transmission of an execution command for implementing cutting of the lead-in section, and transmission of an execution command for implementing cutting of the product section.

Figure 3:
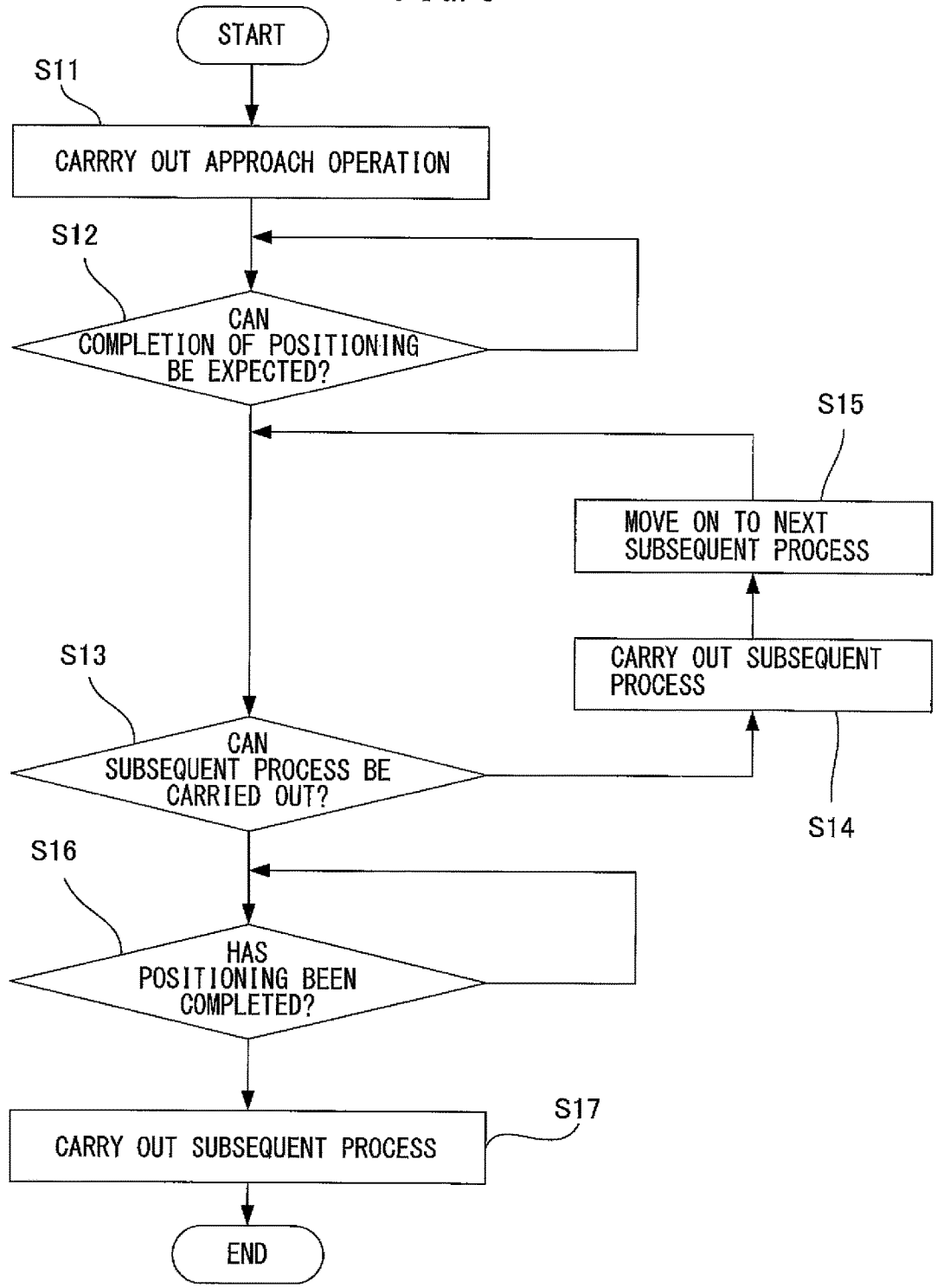
FIG. 3 is a flowchart illustrating a process carried out by a controller according to one embodiment of the present invention.

Referring to FIG. 3, a process carried out by a controller 10 according to one embodiment of the present invention will be described. FIG. 3 is a flowchart illustrating a process carried out by the controller 10.

Before activated, the nozzle NZ of the laser machining device LA awaits at a retracted position sufficiently distant from the workpiece W. When the approach operation starts at step S11, the servo motor M is driven in accordance with a predetermined control program to move the nozzle NZ toward the workpiece W from the retracted position. During this step, the nozzle NZ is moved, for example, at a predetermined constant speed until the nozzle NZ is close enough to the workpiece W that a gap amount G between the nozzle NZ and the workpiece W is within a range in which the gap amount G can be detected by the gap sensor GS. Once the gap amount G is within a detectable range of the gap sensor GS, motion of the servo motor M is controlled based on an actual gap amount G detected by the gap amount detecting part 14 and on the target gap amount specified by the target gap amount specifying part 12. The servo motor M is controlled in accordance with a position command generated by the nozzle position controlling part 16.

At step S12, the completion expectation determining part 20 determines whether or not the completion of the positioning of the nozzle NZ can be expected. The determination process at step S12 may be carried out, for example, based on whether or not the nozzle NZ has come in contact with the workpiece W, on whether or not the nozzle NZ reverses in a moving direction during the approach operation, or on information on the operational state of the nozzle NZ, such as a position, velocity, acceleration, jerk of the nozzle NZ, and the like.

The determination at step S12 is repeatedly carried out until it is determined that the completion of the positioning can be expected with a certain control cycle. However, the controller 10 may be designed to terminate the approach operation of the nozzle NZ in the case where the gap amount detecting part 14 detects the nozzle NZ coming in contact with the workpiece W before it is determined that the completion of the positioning can be expected. In this case, the servo motor M may be driven so as to move the nozzle NZ to the retracted position, for example, without carrying out the following process.

In the case where it is determined at step S12 that the completion of the positioning can be expected, the process proceeds to step S13, at which the subsequent process determining part 22 determines whether or not the subsequent process to be carried out after the approach process of the nozzle NZ can be carried out in the state where the completion of the positioning is only expected. For example, during the piercing process or the cutting process of a lead-in section prior to the cutting process of a product section, the precise positioning of the nozzle NZ is unnecessary. In addition, the preparatory processes necessary to start laser machining, such as an opening process of a valve of assist gas from the nozzle NZ, and an opening process of a mechanical shutter as a safety measure, are also the subsequent process, which does not require the precise positioning of the nozzle NZ.

In the case where it is determined at step S13 that the subsequent process can be carried out, the process proceeds to step S14 to carry out the subsequent process. The process further proceeds to a next process (step S15) following the process carried out at step S14. Then, the process returns to step S14, at which it is determined whether or not the next process can be carried out in the state where the completion of the positioning is only expected. It should be noted that even if the result of the determination at step S13 is affirmative, and therefore the subsequent process is carried out accordingly, the approach process of the nozzle NZ still continues. In other words, in the process of the subsequent process at step S14, the approach operation continues until the positioning of the nozzle NZ is completed.

On the other hand, in the case where it is determined that the subsequent process cannot be carried out in the state where the completion of the positioning is only expected, or in other words that the subsequent process can be carried out only when the positioning of the nozzle NZ is actually completed, the process proceeds to step S16. At step S16, the positioning completion determining part 18 determines whether or not the positioning of the nozzle NZ has been completed. When the result of the determination at step S16 is negative, the approach operation is continued without carrying out the subsequent process.

When it is determined at step S16 that the positioning of the nozzle NZ has been completed, the process proceeds to step S17 where the subsequent process is carried out.

According to the controller and controlling process in the above-described embodiment, even in the state where the precise positioning of the nozzle relative to the workpiece has not been completed, the subsequent process may be carried out, as long as it is possible to carry out the subsequent process in the state where the completion of the positioning can be expected. This reduces the necessary time before the subsequent process is carried out, or in other words, the necessary time for the approach process can be reduced. In the case where the precise positioning of the nozzle is necessary, the laser machining device remains in a waiting state without carrying out the subsequent process until the positioning is completed. Therefore, the processing defect can be avoided, precluding a risk of producing a defective workpiece. In addition, according to the present invention, it is determined that the completion of the positioning can be expected only when there is a high possibility of completing the positioning. Accordingly, the case where the subsequent process proves to be unnecessary due to incompletion of the positioning only after the subsequent process has been carried out, can be avoided. As described above, the present embodiment ensures that the necessary machining is carried out and reduces the necessary time for the approach process, thereby improving productivity.

A first example using the controller 10 according to the above-described embodiment will be described. In this example, a stainless steel plate of 3 mm thickness is cut by a laser machining device. The laser machining device is equipped with a $CO_2$ laser with a rated output of 4 kW. The target gap amount specified by the target gap amount specifying part 12 is 1.0 mm, and the tolerance of the target gap amount is set to ±0.5 mm. The condition for the completion of the positioning is set for the positioning completion determining part 18 such that it determines the completion of the positioning when the gap amount remains within the specified tolerance range of the target gap amount, i.e., from 0.5 mm to 1.5 mm for 0.1 second or longer.

In this example, the condition for the completion expectation is set for the completion expectation determining part 20 such that it determines that the completion of the positioning can be expected when a moving direction of the nozzle is reversed during the approach operation without the nozzle coming in contact with the workpiece. When the nozzle comes in contact with the workpiece, a contact notification is output from the gap amount detecting part 14 and input to the completion expectation determining part 20 through the nozzle position controlling part 16. The "reversal" in a moving direction of the nozzle means that the moving direction in the Z-axis direction as described above with reference to FIG. 1 is changed from a negative direction to a positive direction, or vice versa, and is not directly affected by the motion in the X-axis direction and the Y-axis direction.

Figure 4:
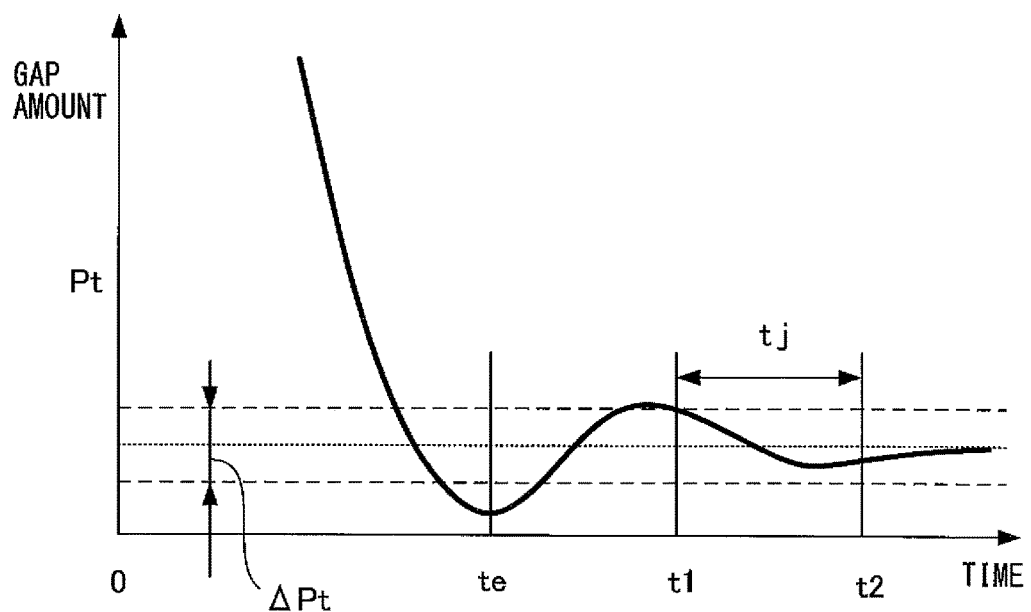
FIG. 4 is a graph related to a controlling process of a laser machining device corresponding to a first example.

FIG. 4 is a graph showing the controlling process of the laser machining device corresponding to the first example. The horizontal axis of the graph represents time, and the vertical axis of the graph represents a gap amount between the nozzle and the workpiece. Dotted line in the drawing represents a target gap amount Pt (1.0 mm in this example), and a pair of dashed line represents a tolerance range ΔPt (0.5 mm to 1.5 mm in this example) specified in relation to the target gap amount Pt.

Conventionally, a subsequent process is carried out only after it is confirmed that the positioning of the nozzle has been completed. The condition for the completion of the positioning in this example is that the gap amount remains within the specified tolerance range ΔPt for 0.1 second or longer, as described above. Accordingly, it is assumed that the positioning of the nozzle is completed at time t2, which is when a specified time tj has elapsed after time t1 at which the gap amount comes within the specified tolerance range ΔPt. Once it is confirmed that the positioning of the nozzle has been completed, the subsequent processes, which should be carried out after the approach process, are carried out successively. According to a comparative example corresponding to the conventional art, time t1 of 0.3 seconds and time t2 of 0.4 seconds have elapsed after the approach operation starts, respectively, and therefore it takes 0.4 seconds before the subsequent process is carried out.

In contrast, in the laser machining device controlled in accordance with the present example, it is assumed that the completion of the positioning can be expected at time te when a moving direction of the nozzle during the approach operation is reversed without the nozzle coming in contact with the workpiece. In this connection, it may be assumed that a moving direction of the nozzle during the approach operation is reversed when the decreasing gap amount detected by the gap amount detecting part 14 turns to increasing. Once it is confirmed that the completion of the positioning can be expected, it is determined whether or not the subsequent process, which should be carried out after the approach process, can be carried out. In the case where it is determined that the subsequent process can be carried out, the subsequent process is carried out at time te when it is assumed that the completion of the positioning can be expected. Therefore, as apparent from FIG. 4, according to the present example, the subsequent process is carried out sooner than in the case of the conventional art. In this example, to is equal to 0.2 seconds, and therefore the approach time is reduced by 0.2 second, as compared to 0.4 seconds in the conventional art.

It should be noted that even after the determination whether or not the subsequent process can be carried out, the positioning of the nozzle continues in the same way as the conventional art, irrespective of the result of the determination. In the case where it is determined that the subsequent process cannot be carried out in the state where the completion of the positioning is only expected, the controller awaits until the positioning of the nozzle has been completed. Accordingly, if this is the case, the subsequent process is carried out at time t2 in the same way as the conventional art.

FIG. 5A is a process schedule corresponding to the machining program executed in the first example. The process schedule shows the necessary time for each process. The process schedule also shows whether or not it is necessary to complete the positioning of the nozzle before the subsequent process, which should be carried out after the approach process, is carried out. More than one processes assigned in the same process number are the processes simultaneously carried out in parallel. Therefore, in the case of the processes being simultaneously carried out, the process having the longest necessary time is finished, the process proceeds to the next process number. As well as the necessary time for the approach process in this example, the necessary time in the comparative example corresponding to the conventional art is shown in the process schedule for comparison.

The processes in the first example will be described in detail. When the process in the first section starts, the nozzle is positioned at a machining start point in the X-axis direction and the Y-axis direction, while remaining at a retracted position in the Z-axis direction (process N10). As a result, the nozzle is positioned above the machining start point. It takes 3.0 seconds to complete the process N10.

Then, the approach process of the nozzle is carried out (process N11). In this example, the process N12 carried out immediately after the approach process includes a return operation for returning the laser oscillator from a waiting state in a power saving mode to an operable state, and an opening operation for opening a supply valve of assist gas. As illustrated, the process N12 is the process which can be carried out before the positioning of the nozzle is completed. Accordingly, in this example, as described above with reference to FIG. 4, the process controlling part 24 of the controller 10 carries out the process N12 at time te, which is when it is determined that the completion of the positioning of the nozzle can be expected. As a result, the process proceeds to the process N12 at te, i.e., 0.2 seconds after the approach process begins. In contrast, according to the conventional art, in which the subsequent process is carried out at time t2 which is when the positioning of the nozzle is completed, it takes 0.4 seconds to finish the approach process.

In the process N12, the above-described two operations are carried out simultaneously. The process proceeds to the next process N13 in 1.0 second, which is when the returning operation of the laser oscillator, which takes more time than the opening operation of the supply valve of assist gas, is completed.

The process N13 is an opening operation of a mechanical shutter of the laser oscillator. The following processes N14 and N15 are piercing and cutting of the lead-in section, which are carried out at a preparatory stage of a cutting process of a workpiece. These processes N13 to N15 are processes which can be carried out in the state where the completion of the positioning is only expected. Therefore, the processes N12 to N15 are carried out continuously without intermittence.

The process N16 is a process for cutting a product section, which requires high accuracy of machining. Therefore, the process N16 must be carried out after the positioning of the nozzle is completed. When the process proceeds to the process N16, the positioning of the nozzle has already been completed. Thus, the process controlling part 24 immediately carries out the process N16 without intermittence.

Figures 5B, 6:
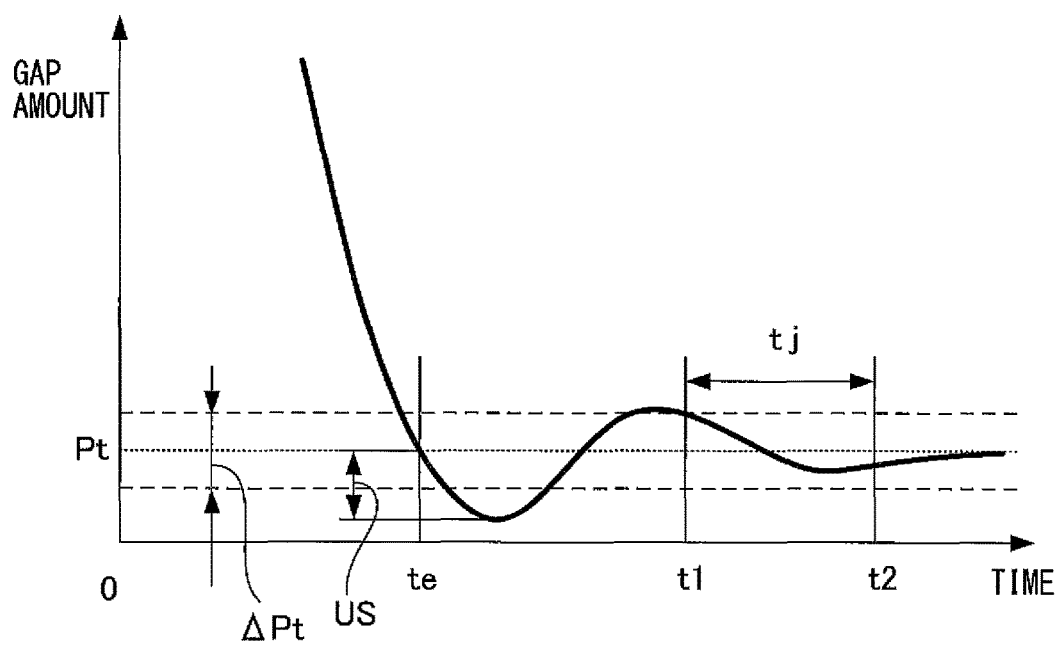
FIG. 5B is a table showing the necessary time of the process carried out in accordance with the first example.
FIG. 6 is a graph related to a controlling process of a laser machining device corresponding to a second example.

FIG. 5B is a table showing the total necessary time of the process carried out in the first example. According to this example, it takes 9.1 seconds to complete the first section in total. As compared to 9.3 seconds in the comparative example, the necessary time in the first section is reduced by 0.2 seconds.

The second section is carried out immediately after the first section. The laser oscillator of the laser machining device is not switched to the power saving mode and there is no need to carry out the return operation, as opposed to the first section. On the other hand, a closing operation for closing the supply valve of assist gas (process N20) is interposed in order to prevent the gas from being wasted during movement of the nozzle to a next machining start point. In addition, for a safety reason, the mechanical shutter of the laser oscillator is closed (process N20). Further, in the process N20, the nozzle is positioned at a retracted position in the Z-axis direction, and at the machining start point in the X-axis direction and the Y-axis direction. As a result, the nozzle is positioned above the machining start point. The positioning above the machining start point does not require as high accuracy as in the positioning to the target gap amount.

The approach process is then carried out (process N21). The process N22 carried out immediately after the approach process in the second section is a process which can be carried out in the state where the completion of the positioning of the nozzle is only expected. Accordingly, in this example, the process N22 is carried out at to (see FIG. 4), which is when it is determined that the completion of the positioning can be expected. In addition, since the processes N23 and N24 can be carried out in the state where the completion of the positioning of the nozzle is expected, these processes are carried out continuously after the process N22.

The process N25 is a process which should be carried out when the positioning of the nozzle has been completed. However, at the time of the process N25, the positioning of the nozzle in relation to the target gap amount has already been completed. Accordingly, the process N25 is immediately carried out after the process N24. As shown in FIG. 5B, it takes 4.3 seconds to carry out the second section, and the necessary time is reduced by 0.2 seconds, as compared to the conventional art.

In the third section, the time necessary to move the nozzle from the position at the end of the second section to a next machining start point is relatively short, and the closing operation of the supply valve of assist gas and the closing operation of the mechanical shutter are not carried out, as opposed to the second section. Therefore, the positioning to a position above the machining start point is only carried out in the process N30.

The piercing (the process N32) and the following cutting of the lead-in section (the process N33), which are to be carried out after the approach process in the process N31, can be carried out in the state where the completion of the positioning of the nozzle is only expected. Specifically, in the case of the workpiece made of stainless steel plate of 3 mm thickness, the piercing and the cutting of the lead-in section can be carried out without affecting on a quality of the product, as long as the nozzle is within a range of the gap amount of 2 mm. Accordingly, the subsequent process determining part 22 determines that these processes can be carried out in the state where the completion of the positioning is only expected.

Also in the third section, the process proceeds to the subsequent process at time to (see FIG. 4), which is when it is determined that the completion of the positioning can be expected, to carry out the processes N32 and N33. As a result, the necessary time to carry out the approach process is shortened. Although the following process N34 requires the completion of the positioning of the nozzle, the positioning of the nozzle is already completed at the time of the process N34, and therefore the process N34 is carried out immediately after the process N33.

Referring to FIG. 5B, it takes 8.3 seconds to carry out the third section, and the necessary time is reduced by 0.2 seconds, as compared to the conventional art. According to this example, the total necessary time to carry out the first to third sections is reduced by 0.6 seconds, as compared to the conventional art, or in other words, the reduction of 3% is realized.

A second example using the controller 10 will be described below. In the second example, a plate member of 1 mm thickness made of mild steel is cut by using a laser machining device. The laser machining device is equipped with a $CO_2$ laser with a rated power of 4 kW. The target gap amount specified by the target gap amount specifying part 12 is 2.0 mm, and the tolerance of the target gap amount is set to ±0.5 mm. The condition for the completion of the positioning is set for the positioning completion determining part 18 such that it determines the completion of the positioning when the gap amount remains within the specified tolerance range of the target gap amount, i.e., from 1.5 mm to 2.5 mm for 0.1 second or longer.

In this example, an amount of undershoot is calculated when the nozzle is moved toward the workpiece during the approach operation, and the obtained undershoot amount and the target gap amount are compared with each other. If the undershoot amount is smaller than the target gap amount, it is determined that the completion of the positioning can be expected. The undershoot amount is an estimated distance over which the nozzle travels toward the workpiece before the moving direction of the nozzle is reversed, and calculated based on the velocity at a time when the nozzle has reached a position corresponding to the target gap amount.

In this example, the undershoot amount used by the completion expectation determining part 20 is calculated by the interpolation calculation based on a group of sample data showing the relationship between the velocity of the nozzle and the undershoot amount, which has been previously obtained by experiment. If the controller has high computational capabilities, the undershoot amount may be more precisely calculated by further taking into account acceleration of the nozzle or acceleration and a jerk of the nozzle, which are obtained by the nozzle position controlling part 16. Generally, when the nozzle has reached a position corresponding to the target gap amount, the precise gap amount can be detected by the gap amount detecting part 14. Accordingly, a risk of the collision between the nozzle and the workpiece can be avoided even if the expectation of the completion of the positioning is determined based on the previous experimental result or the estimation, as described above in relation to this example.

FIG. 6 is a graph showing a controlling process of the laser machining device according to the second example. FIG. 6 corresponds to FIG. 4, which is referred in relation to the first example. According to this example, it is determined that the completion of the positioning of the nozzle can be expected when the undershoot amount US at a time when the nozzle passes a position corresponding to the target gap amount is smaller than the target gap amount Pt. According to the second example, it is determined sooner than the first example, or specifically, at time te, which is 0.15 seconds after the approach operation starts, that the completion of the positioning of the nozzle can be expected. Therefore, if the subsequent process after the approach process can be carried out in the state where the completion of the positioning is only expected, the subsequent process can be started 0.25 seconds sooner than the conventional art.

Also in this example, the positioning of the nozzle to a position corresponding to the target gap amount continues, irrespective of the result of the determination by the subsequent process determining part 22. Accordingly, the positioning completion determining part 18 determines that the positioning is completed at t2, or at 0.4 seconds.

FIG. 7A is a process schedule corresponding to the machining program carried out in the second example. FIG. 7A corresponds to FIG. 5A referred in relation to the first example. As opposed to the first example, since the workpiece in this example has a smaller thickness, the cutting of the lead-in section can be carried out without piercing. Therefore, the piercing is omitted in this example.

According to this example, it is determined at 0.15 seconds after the approach operation starts that the completion of the positioning can be expected, as described above. The process N212 in the first section after the approach process can be carried out in the state where the completion of the positioning is only expected. Therefore, the N211 corresponding to the approach operation is completed in 0.15 seconds and the process proceeds to the next process N212. As described above, the positioning of the nozzle to a position corresponding to the target gap amount continues after the process N212.

In the process N212, the return operation for retuning the laser oscillator from the power saving mode, and the opening operation of the supply valve of assist gas are carried out in parallel simultaneously. The process proceeds to the next process N213 in 1.0 second when the returning process, which takes more time than the opening operation, is completed. The processes N213 and N214 can be carried out in the state where the completion of the positioning is only expected. Accordingly, these processes are immediately carried out.

In the last process N215 of the first section, a product section is cut, which requires the completion of the positioning of the nozzle. However, at the time of the process N215, the positioning of the nozzle is already completed. Thus, the process controlling part 24 carries out the process N215 immediately.

FIG. 7B is a table showing the necessary time of the processes in each section carried out in the second example. As shown in FIG. 7B, 0.25 seconds can be reduced in the first section, as compared to the comparative example corresponding to the conventional art.

Similarly to the first section, according to this example, the necessary time to proceed from the approach operation in the process N221 to the next process N222 in the second section can be reduced by 0.25 seconds.

The third section is carried out immediately after the second section, and the nozzle can be moved to a position above a machining start point of the third section for a short period of time. Thus, the switch to the power saving mode, the closing operation of the supply valve of assist gas and the closing operation of the mechanical shutter are omitted, and therefore there is no need for the returning operation from the power saving mode, the opening operation of the supply valve of assist gas and the opening operation of the mechanical shutter after the approach operation.

Since the piercing is omitted in this example as described above, the cutting of a lead-in section in the process N232 is carried out immediately after the approach process in the process N231. The cutting of a lead-in section can be carried out in the state where the completion of the positioning is only expected. Accordingly, when it is determined that the completion of the positioning can be expected, which is 0.15 seconds after the approach operation starts, the process proceeds to the process N232.

The process 233 is the cutting of a product section, which requires the completion of the positioning of the nozzle. It takes 0.4 seconds to complete the positioning of the nozzle, but when the process N232 ends, only 0.35 seconds elapses and the positioning of the nozzle has not been completed. Accordingly, the process N233 is not carried out until it is determined that the positioning of the nozzle has been completed. Specifically, after the halt of 0.05 seconds, the process N233 is carried out. In spite of the halt of 0.05 seconds, the third section can be shortened by 0.2 seconds due to the reduction of 0.25 seconds in the approach operation in the process N231, as compared to the conventional art.

Referring to FIG. 7B again, this example can shorten the necessary time of the first and second sections by 0.25 seconds, respectively, and the third section by 0.2 seconds, and therefore, the reduction of 0.7 seconds or about 5% in the necessary time can be realized.

A third example using the controller 10 will be described below. In the third example, using the same laser machining device as in the second example, a plate member made of mild steel of 1 mm thickness is cut. The target gap amount, the tolerance of the target gap amount and the condition of the determination adopted by the completion expectation determining part 20 are also the same as in the second example.

On the other hand, the positioning completion determining part 22 is designed to determine that the positioning is completed when the nozzle is within a predetermined tolerance range and after it is determined that the completion of the positioning can be expected. It is empirically known that once it is determined that the completion of the positioning can be expected, the gap amount of the nozzle thereafter gradually decreases to the target gam amount in the form of damped oscillation. Based on this known fact, this example is intended to determine the completion of the positioning sooner.

Figures 8, 9:
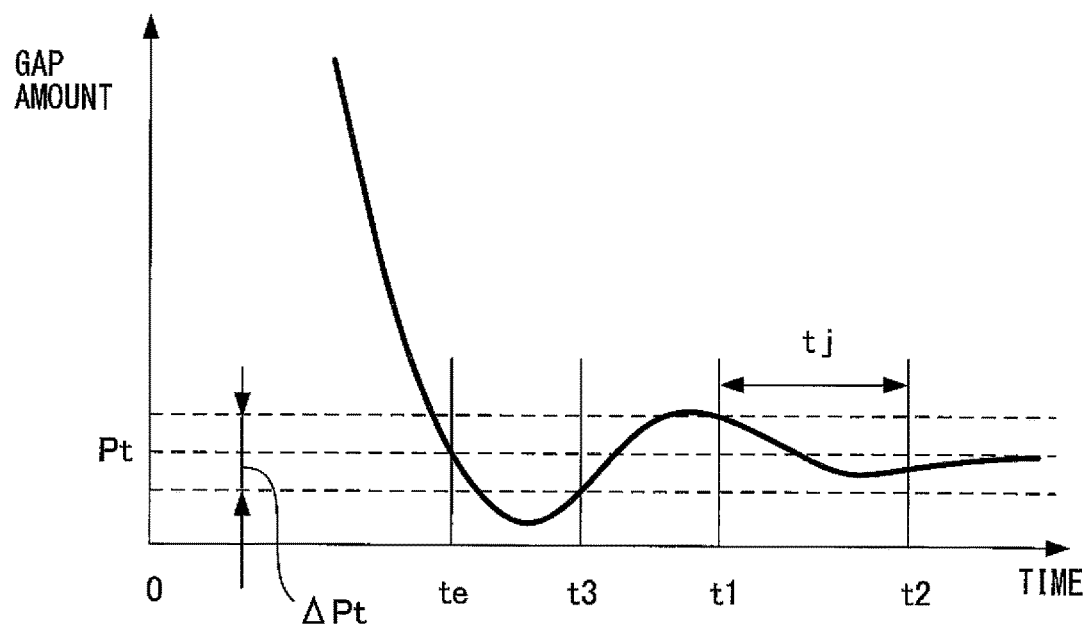
FIG. 8 is a graph related to a controlling process of a laser machining device corresponding to a third example.
FIG. 9 is a table showing the necessary time of the processes carried out in accordance with the third example.
Figure 10A:
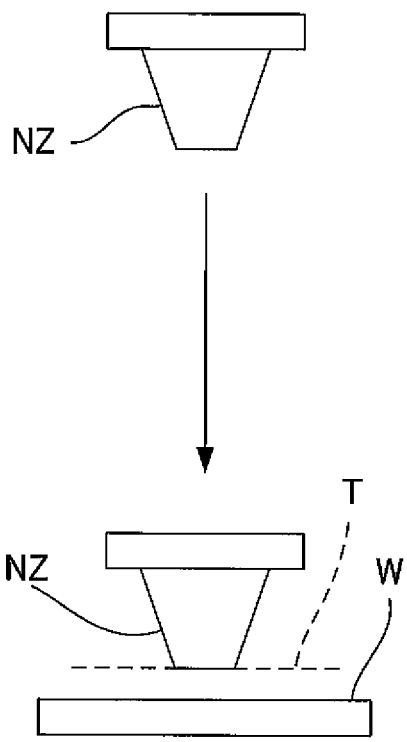
FIG. 10A shows an approach operation of a nozzle of a laser machining device.
Figure 10B:
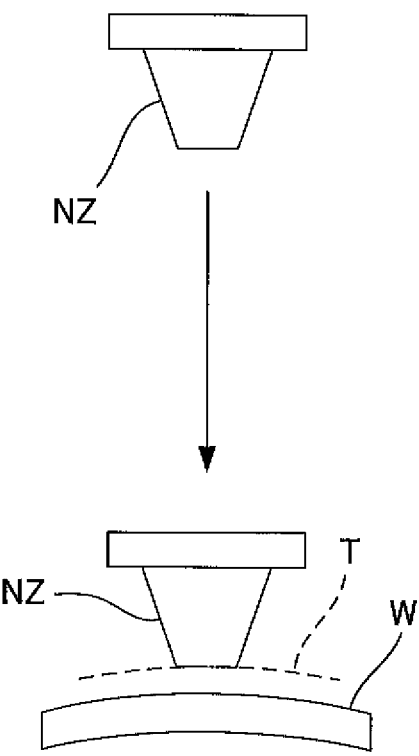
FIG. 10B shows an approach operation of a nozzle of a laser machining device.
Figure 10C:
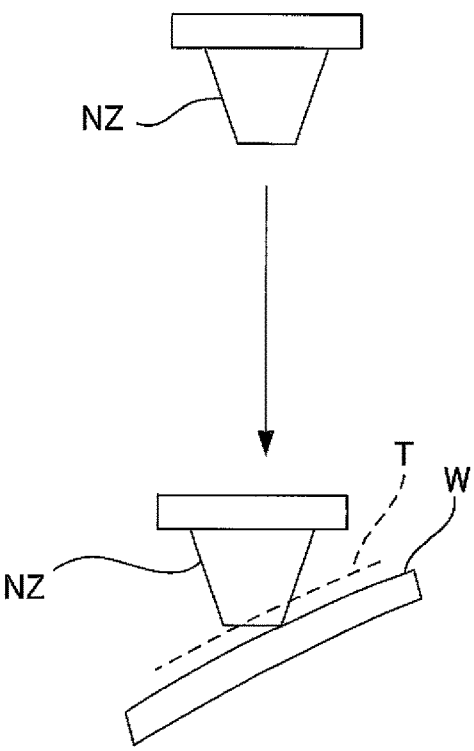
FIG. 10C shows an approach operation of a nozzle of a laser machining device.
Figure 10D:
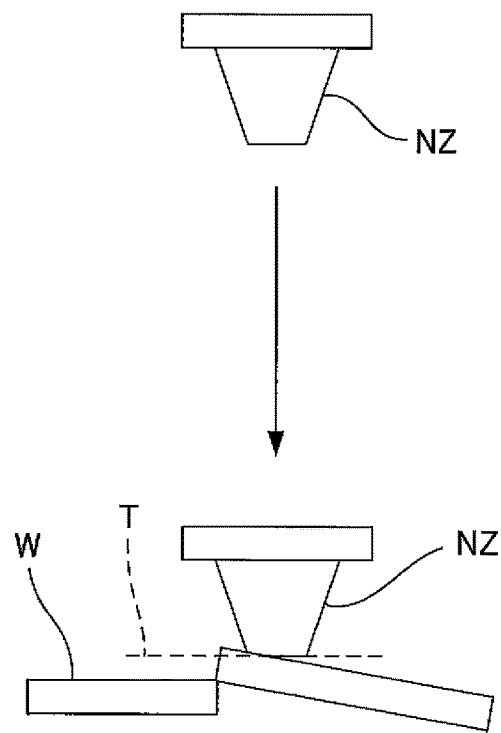
FIG. 10D shows an approach operation of a nozzle of a laser machining device.

FIG. 8 is a graph illustrating a control process by the laser machining device corresponding to the third example. FIG. 8 corresponds to FIG. 4 in the first example and FIG. 6 in the second example. In this example, similarly to the second example, it is determined at time te that the completion of the positioning can be expected, and it is determined the completion of the positioning at time t3 when the gap amount is within a predetermined tolerance range ΔPt between 1.5 mm and 2.5 mm for the first time after time te. As a result of the change of the condition for the determination by the positioning completion determining part 18, it is determined that the positioning is completed at t3, or at 0.22 seconds, in this example.

Using the controller 10 including the positioning completion determining part 18 configured according to this example, the same machining program as the second example is carried out. In this case, the results of the first and second section are not different between the second example and the third example, but the halt of 0.05 seconds interposed before the process N233 in the third section according to the second example does not occur in the third example. Specifically, according to the third example, when the process proceeds to the process N233, the positioning completion determining part 18 notifies the process controlling part 24 that the positioning has been completed. Thus, the process controlling part 24 carries out the process N233 immediately after the process N232.

FIG. 9 is a table showing the total necessary time of the processes carried out in the third example. In this example, the necessary time of the third section can be reduced by 3.85 seconds. As compared to the comparative example, the necessary time can be reduced by 0.75 seconds in total, including the first and second sections.

According to a variant of the third example, a different condition for the determination of the completion of the positioning may be specified. For example, an overshoot amount, which can be estimated based on information on the operational state of the nozzle at time t3 of FIG. 8, may be taken into account for the condition for the determination. For example, the overshoot amount may be estimated based on the velocity, acceleration and jerk of the nozzle or the like at time t3 in the same way as described above in relation to the estimation of the undershoot amount in the second example. For example, it may be taken into account whether or not the estimated overshoot amount is within a predetermined tolerance range ΔPt. Alternatively, it may be determined that the positioning is completed, when the moving direction of the nozzle is reversed at least once within the tolerance range ΔPt and after it is determined that the completion of the positioning can be expected. Such variants may be effective when relatively strict accuracy of positioning is necessary. According to these variants, the completion of the positioning is notified sooner than the second example, and therefore the halt of 0.05 seconds occurring in the third section of the second example may be eliminated or reduced.

EFFECT OF THE INVENTION

According to the invention as described above, when the completion of the positioning of the nozzle can be expected, if the subsequent process can be carried out in the state where the completion of the positioning is only expected, the subsequent process is carried out without waiting for the completion of the positioning. Accordingly, the subsequent process, which can be carried out without the completion of the positioning, is carried out sooner. This yields the same effect of reducing the necessary time of the approach operation. Since it is determined that the completion of the positioning can be expected only when there is a high possibility that the positioning of the nozzle will be completed, the subsequent process can be prevented from being wasted.

Although the various embodiments and modifications of the present invention have been described above, it is apparent to those skilled in the art that other embodiments and modifications may also provide the functions and effects intended by the present invention. In particular, one or more of the constituent elements of the embodiments and modifications described above may be omitted or replaced or any known means may further be added, without departing from the scope of the present invention. It is also apparent to those skilled in the art that the invention may also be performed by any combination of the features of the different embodiments explicitly or implicitly disclosed in the present specification.

What is claimed is:

1. A controller for controlling a laser machining device, wherein the laser machining device includes a nozzle for radiating laser, the controller comprising:
    a processor programmed to specify a target gap amount and a tolerance of the target gap amount, the target gap amount corresponding to a distance between the nozzle and a workpiece during laser machining; and
    a sensor configured to detect an actual gap amount between the nozzle and the workpiece,
    wherein the processor is programmed to
        control a position of the nozzle based on the target gap amount and the actual gap amount,
        determine whether or not positioning of the nozzle is completed in accordance with the target gap amount and the tolerance of the target gap amount,
        determine whether or not completion of the positioning of the nozzle is expected, and
        determine whether or not a subsequent process is to be carried out in a state where completion of the positioning of the nozzle is expected, wherein the subsequent process has been designated in the controller to be carried out after the positioning of the nozzle is completed,
    wherein the processor is programmed to
        in response to a determination that the subsequent process is to be carried out in a state where completion of the positioning of the nozzle is expected,
            cause the subsequent process to be carried out at a time when the processor determines that completion of the positioning of the nozzle is expected, and
        in response to a determination that the subsequent process is not to be carried out in a state where completion of the positioning of the nozzle is expected,
            cause the subsequent process to be carried out at a time when the processor determines that the positioning of the nozzle is completed, and
    wherein the processor is programmed to determine whether or not completion of the positioning of the nozzle is expected, based on
        (1) whether or not the nozzle and the workpiece have come in contact with each other, and
        (2) information on an operational state of the nozzle, when the nozzle has not come in contact with the workpiece.

2. The controller according to claim 1, wherein
the processor is further programmed to, irrespective of the result of determining whether or not a subsequent process is to be carried out in a state where completion of the positioning of the nozzle is expected,
    continue to control the positioning of the nozzle, and
    continue to determine whether or not the positioning of the nozzle is completed.

3. The controller according to claim 1, wherein
the processor is programmed to determine whether or not completion of the positioning of the nozzle is expected, based further on whether or not a moving direction of the nozzle is reversed at least once.

4. The controller according to claim 1,
wherein a target gap range is set based on the target gap amount and the tolerance of the target gap amount, and
wherein the processor is further programmed to determine that the positioning of the nozzle is completed
    when an actual position of the nozzle comes within the target gap range, and
    after the processor determines that completion of the positioning of the nozzle is expected.

5. The controller according to claim 1,
wherein a target gap range is set based on the target gap amount and the tolerance of the target gap amount, and
wherein the processor is further programmed to determine that the positioning of the nozzle is completed
    when an actual position of the nozzle comes within the target gap range and a moving direction of the nozzle is reversed at least once, and
    after the processor determines that completion of the positioning of the nozzle is expected.

* * * * *